(12) United States Patent
Liao et al.

(10) Patent No.: US 11,305,838 B2
(45) Date of Patent: Apr. 19, 2022

(54) DERAILLEUR POSITION SETTING SYSTEM AND METHOD THEREOF

(71) Applicant: TEKTRO TECHNOLOGY CORPORATION, Changhua County (TW)

(72) Inventors: Bo-Yi Liao, Changhua County (TW); Hsun-Yu Chuang, Changhua County (TW)

(73) Assignee: TEKTRO TECHNOLOGY CORPORATION, Changhua County (TW)

( * ) Notice: Subject to any disclaimer, the term of this patent is extended or adjusted under 35 U.S.C. 154(b) by 52 days.

(21) Appl. No.: 17/087,946

(22) Filed: Nov. 3, 2020

(65) Prior Publication Data
US 2021/0163097 A1    Jun. 3, 2021

(30) Foreign Application Priority Data
Dec. 2, 2019    (TW) .................................. 108143938

(51) Int. Cl.
*B62M 9/122*    (2010.01)
*H04M 1/72415*    (2021.01)

(52) U.S. Cl.
CPC ........ *B62M 9/122* (2013.01); *H04M 1/72415* (2021.01)

(58) Field of Classification Search
CPC ...... B62M 9/122; B62M 25/04; B62M 25/08; H04M 1/72415; H04M 1/72412; F16H 2061/0223
See application file for complete search history.

(56) References Cited

U.S. PATENT DOCUMENTS

| | | | | |
|---|---|---|---|---|
| 2016/0288877 A1* | 10/2016 | Goates | ................... | B62M 9/122 |
| 2018/0304966 A1* | 10/2018 | Chien | ................... | B62M 9/122 |
| 2019/0351971 A1* | 11/2019 | Dueweling | ............ | B62M 9/123 |

FOREIGN PATENT DOCUMENTS

EP    1584551 A2 *   10/2005   ............. B62K 23/06

* cited by examiner

*Primary Examiner* — Justin Holmes
(74) *Attorney, Agent, or Firm* — Locke Lord LLP; Tim Tingkang Xia, Esq.

(57) ABSTRACT

A derailleur position setting method is adaptable to a bicycle. The method comprises sending an adjustment instruction to a driver by the controller, setting the derailleur to a gear position according to the adjustment instruction by the driver, sending an encoded value corresponding to the gear position to a mobile device by the controller, and sending a position table to the controller according to the encoded value by the mobile device, wherein the position table comprises a plurality of position parameters, each position parameter indicates a designated gear position to which the derailleur is allowable to be set.

16 Claims, 5 Drawing Sheets

DERAILLEUR POSITION SETTING SYSTEM AND METHOD THEREOF

CROSS-REFERENCE TO RELATED APPLICATIONS

This non-provisional application claims priority under 35 U.S.C. § 119(a) on Patent Application No(s). 108143938 filed in Taiwan, ROC on Dec. 2, 2019, the entire contents of which are hereby incorporated by reference.

BACKGROUND

Technical Field

This disclosure relates to an electronic gear-shifting system of a bicycle, and more particularly to a derailleur position setting system and method thereof.

Related Art

When the electronic derailleur was first installed on the bicycle, the derailleur did not know its current position on the frame, so it was also unable to recognize how the derailleur should be set when shifting gears. A traditional method is that the user observes the relative position relationship between the derailleur and the cassette by his eyes, and then selects one from multiple position tables stored in the derailleur as a reference basis for switching gears afterwards.

However, these position tables burned in the derailleur cannot cover all setting conditions, and the burned data cannot be adjusted. The traditional method lacks scalability, and also brings a lot of inconvenience to users in position table updating. Moreover, the computing resources of the micro control unit (MCU) inside the derailleur are also occupied due to the selection of the position table, which affects the computing power of the MCU.

SUMMARY

In view of the above, this disclosure provides a derailleur position setting system and method thereof, and thus reducing the loading of the microcontroller in the derailleur and increasing the flexibility of extension of the gear position tables.

According to one or more embodiment of the present disclosure, a derailleur position setting method adapted to a bicycle comprising: sending an adjustment instruction to a driver by a controller; setting the derailleur to a gear position according to the adjustment instruction by the driver; sending an encoded value corresponding to the gear position to a mobile device by the controller; and sending a position table to the controller according to the encoded value by the mobile device; wherein the position table comprises a plurality of position parameters, and each of the plurality of position parameters indicates a designated gear position to which the derailleur is allowable to be set.

According to one or more embodiment of the present disclosure, a derailleur position setting method adapted to a bicycle comprising: sending a plurality of position tables to a controller by a mobile device, wherein the position tables are different from one another, each of the position tables has a plurality of position parameters, and each of the plurality of position parameters indicates a designated gear position to which the derailleur is allowable to be set; sending an adjustment instruction to a driver by the controller; setting the derailleur to a gear position according to the adjustment instruction by the driver; sending an encoded value corresponding to the gear position to the controller by the driver; and selecting one from the plurality of position tables according to the encoded value and controlling the derailleur according to the selected position table by the controller.

According to one or more embodiment of the present disclosure, a derailleur position setting system adapted to a bicycle comprising: a derailleur allowable to be set in a plurality of gear positions; a driver connecting to the derailleur and setting the derailleur to one of the plurality of gear positions according to an adjustment instruction; a controller electrically connecting to the driver, wherein the controller is configured to send the adjustment instruction and send an encoded value of said one of the plurality of gear positions; and a mobile device communicably connecting to the controller, wherein the mobile is configured to store the plurality of position tables, receive the encoded value from the controller, and send one of the plurality of position tables to the controller according to the encoded value; wherein each of the position tables has a plurality of position parameters, and each of the plurality of position parameters indicates a designated gear position to which the derailleur is allowable to be set.

According to one or more embodiment of the present disclosure, a derailleur position setting system adapted to a bicycle comprising: a derailleur allowable to be set in a plurality of gear positions; a driver connecting to the derailleur and setting the derailleur to one of the plurality of gear positions according to an adjustment instruction; a controller electrically connecting to the driver, wherein the controller is configured to send the adjustment instruction and send an encoded value of said one of the plurality of gear positions; and a mobile device communicably connecting to the controller, wherein the mobile is configured to store a position function, receive the encoded value from the controller, input the position function with the encoded value to generate a plurality of position parameters, form a position table with the plurality of position parameters and send the position table to the controller; wherein each of the plurality of position parameters indicates a designated gear position to which the derailleur is allowable to be set.

According to one or more embodiment of the present disclosure, a derailleur position setting system adapted to a bicycle and a mobile device, wherein the mobile device is configured to store a plurality of position tables and the system comprises: a derailleur allowable to be set in a plurality of gear positions; a driver connecting to the derailleur and setting the derailleur to one of the plurality of gear positions according to an adjustment instruction; and a controller electrically connecting to the driver, wherein the controller is configured to send the adjustment instruction and drive the mobile device to return one of the plurality of position tables with said one of the plurality of position tables corresponds to the encoded value; wherein said one of the plurality of position tables has a plurality of position parameters, and each of the plurality of position parameters indicates a designated gear position to which the derailleur is allowable to be set.

According to one or more embodiment of the present disclosure, a derailleur position setting system adapted to a bicycle and a mobile device, wherein the mobile device is configured to store a position function and the system comprises: a derailleur allowable to be set in a plurality of gear positions; a driver connecting to the derailleur and setting the derailleur to one of the plurality of gear positions according to an adjustment instruction; and a controller electrically connecting to the driver, wherein the controller is configured to send the adjustment instruction, send an encoded value corresponding to said one of the plurality of gear positions to the mobile device, and drive the mobile device to return a position table associated with the encoded value; wherein the position table returned to the controller has a plurality of position parameters, the plurality of position parameters is calculated by inputting the position function with the encoded value by the mobile device; and each of the plurality of position parameters indicates a designated gear position to which the derailleur is allowable to be set.

In view of the above description, the derailleur position setting system and method thereof proposed by the present disclosure store the position table or the position function in an external device such as a mobile device, and thus increasing the scalability of the position table. The present disclosure allows the user to easily update the position parameters of the position table without being limited to the default values stored in the controller. Furthermore, because the microcontroller in the derailleur only needs to send the encoded value associated with the position, the microcontroller does not need to calculate the position table associated with the encoded value. Therefore, the power consumption and other computation costs of the microcontroller can be saved.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
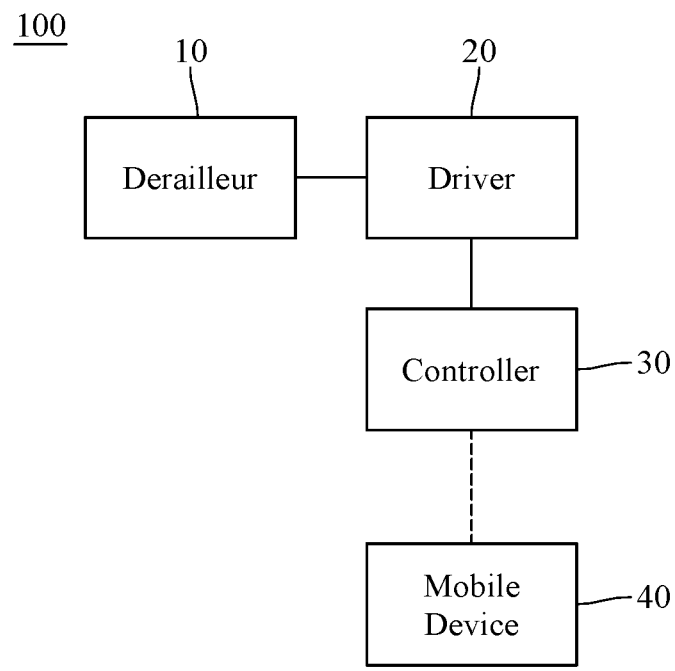
FIG. 1 is a block diagram of the derailleur position setting system according to an embodiment of the present disclosure.

Please refer to FIG. 1, which illustrates a block diagram of the derailleur position setting system 100 according to an embodiment of the present disclosure. The derailleur position setting system 100 of this embodiment comprises a derailleur 10, a driver 20, a controller 30 and a mobile device 40. In an embodiment, each of the driver 20, the controller 30, and the mobile device 40 has a wireless communication module. The driver 20, the controller 30, and the mobile device 40 send and receive messages through their wireless communication module. The message will be described in detail below.

The derailleur 10 is allowable to be set in a plurality of gear positions. The derailleur 10 has a chain guide. These gear positions are, for example, the positions on the bicycle frame for installing the rear derailleur.

The driver 20 connects to the derailleur 10. The driver 20 is installed on a cassette of the bicycle, and the cassette has a plurality of sprockets. In an embodiment of the present disclosure, the driver 20 is, for example, a motor driver, which sets the derailleur 10 to one of the plurality of gear positions according to an adjustment instruction. Specifically, based on a designated distance of the adjustment instruction, the driver 20 drives the chain guide of the derailleur 10 to move the designated distance so that the derailleur 10 is set to said one of gear positions, wherein the designated distance is smaller than a distance (interval) of two adjacent sprockets of the plurality of sprockets.

In an embodiment of the present disclosure, the derailleur 10 and the driver 20 are, for example, components of the rear derailleur. The chain guide of the derailleur 10 is allowable to move in multiple gear positions so that the specific sprocket may drive the chain to realize the purpose of gear-shifting.

The controller 30 electrically connects to the driver 20. For example, the controller 30 is a microcontroller or a system-on-chip (SoC). The present disclosure does not limit the hardware type of the controller 30. In an embodiment of the present disclosure, the controller 30 is installed on the rear derailleur of the bicycle. In another embodiment of the present disclosure, the controller 30 is installed on the left handlebar or the right handlebar. The controller 30 may send the adjustment instruction and send an encoded value corresponding to said one of gear positions. In the following, instructions or data sent or received by the controller 30 will be additionally explained.

In an embodiment of the present disclosure, the controller 30 has two operation mode: normal mode and fine-tuning mode. The difference between these two modes is the adjustment level of the adjustment instruction. The adjustment level in the normal mode is greater than the adjustment level in the fine-tuning mode. In other words, when the controller 30 is in the normal mode, the distance that the driver 20 moves the derailleur 10 each time according to the adjustment instruction is greater than the distance that the driver 20 moves the derailleur 10 each time according to the adjustment instruction when the controller 30 is in the fine-tuning mode.

Please refer to FIG. 1. The mobile device 40 communicably connects to the controller 30. In an embodiment of the present disclosure, the mobile device may store a plurality of position tables (candidate position tables). It should be noted that the position tables do not necessarily have a one-to-one correspondence with the gear positions. For example, there are multiple positions that can set the derailleur 10 from the first gear to the second gear, each of these positions corresponds to a position table. Each position table has a plurality of position parameters, and each position parameter is used to indicate a designated position to which the derailleur 10 can be set.

The mobile device 40 receives the encoded value sent from the controller 30. Based on the encoded value, the mobile device 40 selects one from the plurality of position tables and sent said one of the position tables to the controller 30. The controller 30 may selectively send this position table to the driver 20. Specifically, the mobile device 40 calculates a plurality of difference values between the encoded value and the plurality of position parameters of the plurality of position tables respectively, (that is, between the encoded value and each of the position parameters of each of the position tables), selects the position table corresponding to the minimal one of the difference values, and sends the selected position table to the controller 30. It should be noted that the difference value may be the smallest positive value or the smallest absolute value, and the present disclosure does not limit thereto.

In another embodiment of the present disclosure, the mobile device 40 stores a position function. The mobile device 40 inputs the position function with the encoded value received from the controller 30, and generates a plurality of position parameters corresponding to a plurality of gear positions. The mobile device 40 collects these position parameters to form a position table, and send the table to the controller 30.

In practice, the mobile device 40 is, for example, an electronic component manufactured by the bicycle vender. This electronic component may wirelessly communicate with the controller 30 and have a computing function. The present disclosure does not limit the hardware type of the mobile device 40. The mobile device 40 has storage components configured to store the plurality of position tables. Said storage component is, for example, a pluggable memory card. The user may update the position table stored in the storage component by his computer. Therefore, the present disclosure has the flexibility of the extension of position table.

Figure 2:
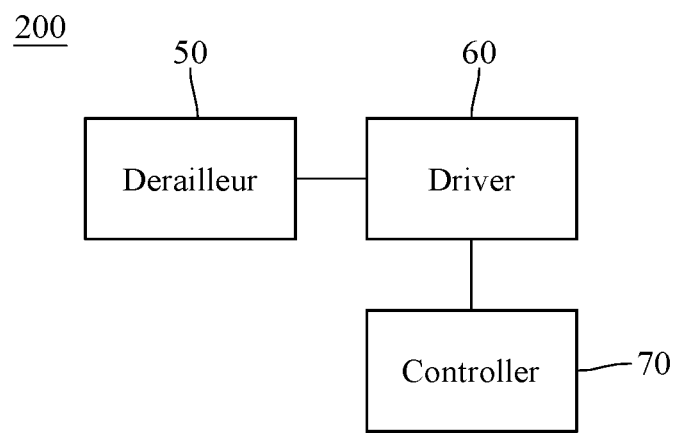
FIG. 2 is a block diagram of the derailleur position setting system according to another embodiment of the present disclosure.

Please refer to FIG. 2, which illustrates a block diagram of the derailleur position setting system 200 according to another embodiment of the present disclosure. The derailleur position setting system 200 is adapted to a bicycle and a mobile device, wherein the mobile device is, for example, a smartphone or a tablet computer, which may perform application designed by the bicycle manufacturer and download a plurality of position table. Therefore, it is more flexible in the update and expansion of the position table in the derailleur position setting system 200 according to said another embodiment of the present disclosure.

The derailleur position setting system 200 comprises a derailleur 50, a driver 60, and a controller 70, wherein the derailleur 50 and the driver 60 are identical to the derailleur 10 and the driver 620 of the previous embodiment, so their descriptions are not repeated here. The controller 70 electrically connects to the driver 60. The controller 70 may send an adjustment instruction, and send an encoded value corresponding to the current position of the derailleur 50 to the mobile device. The controller 70 may drive the mobile device to return a position table associated with the encoded value, wherein the position table returned to the controller 70 comprises a plurality of position parameters and each position parameters indicates a designated gear position to which the derailleur 50 is allowable to be set.

Figure 3:
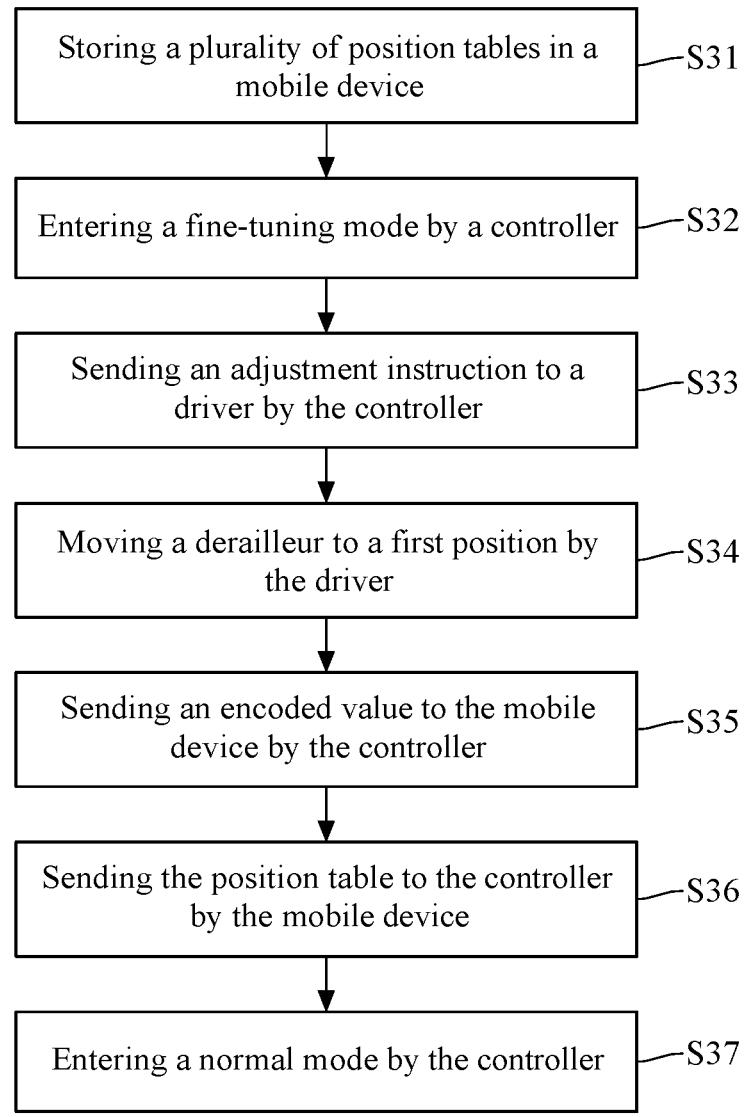
FIG. 3 is a flow chart of the derailleur position setting method according to an embodiment of the present disclosure.

Please refer to FIG. 3, which illustrates a flow chart of the derailleur position setting method according to an embodiment of the present disclosure. Said method is adapted to the derailleur position setting systems 100 as shown in FIG. 1 or adapted to the derailleur position setting systems 200 as shown in FIG. 2. The following takes the derailleur position setting systems 100 as the example for description.

Step S31 shows "storing a plurality of position tables in a mobile device 40". For example, the user operates his mobile device 40 to download the position table from the website of the bicycle manufacturer.

Step S32 shows "entering a fine-tuning mode by a controller 30". In an embodiment of the present disclosure, the user performs a first operation to the controller 30 installed on the handlebar. The first operation is, for example, long pressing the forward shift button and the backward shift button on the left handlebar. In another embodiment of the present disclosure, the user performs a first operation to the controller 30 installed on the rear derailleur. The first operation is, for example, pressing the fine-tuning mode button on the rear derailleur. In should be noticed that the buttons and the operations described above are examples and are not intend to limit the first operation. The controller 30 enters the fine-tuning mode according to the first operation when the controller 30 determines that the controller 30 receivers the first operation.

Step S33 shows "sending an adjustment instruction to a driver 20 by the controller 30". In an embodiment of the present disclosure, the user presses the button on the handlebar to drive the controller 30 to send an adjustment instruction configured to set the derailleur 10 to the driver 20. In another embodiment of the present disclosure, the user operates the mobile device 40 to generate the adjustment instruction, the mobile device 40 sends the adjustment instruction to the controller 30, and then the controller 30 sends the adjustment instruction to the driver 20.

Step S34 shows "moving a derailleur 10 to a first position by the driver 20". Specifically, the driver 20 sets the derailleur 10 according to the adjustment instruction sent by the user through the controller 30 in step S33 until the user visually determines whether the derailleur 10 is aligned with a specific gear position on the cassette. At this time, the gear position of the derailleur is called the first position.

After the user determines the first position in step S34, Step S35 shows "sending an encoded value to the mobile device 40 by the controller 30". How the user determines the first position can be divided into manual determination or automatic determination. In an example of the manual determination, the user operates the mobile device 40 to generate a return instruction, and the mobile device 40 sends the return instruction to the controller 30. In another example of manual determination, the user operates a button on the handlebar or rear derailleur, thereby triggering the controller 30 on the handlebar or rear derailleur to generate a return instruction. In the example of automatic determination, when the controller 30 detects the following conditions, "the controller 30 is in the fine-tuning mode" and "the controller 30 has not received any operation associated with the adjustment instruction for more than a specified interval", the controller 30 will generate and send a return instruction to the driver 20. Based on the above examples, after the controller 30 receives the return instruction or the controller 30 itself generates the return instruction, the controller 30 sends the return instruction to the driver 20. When the driver 20 receives the return instruction, it means that the user has completed the determination of the first position, so the driver 20 generates the corresponding encoded value according to the first position, and sends the encoded value to the mobile device 40. An example of the sending path is that the encoded value is sent directly from the driver 20 to the mobile device 40. Another example of the sending path is that the encoded value is sent from the driver 20 to the mobile device 40 through the controller 30. In other words, the driver 20 sends the encoded value to the controller 30, and the controller 30 then forwards the encoded value to the mobile device 40.

Step S36 shows "sending the position table to the controller 30 by the mobile device 40". Specifically, after receiving the encoded value sent from the controller 30, the mobile device 40 calculates difference values between the encoded value and each of the position parameters (candidate position parameters) stored by the mobile device 40. The mobile device 40 selects one position table corresponding to the position parameter with the smallest difference value. The mobile device 40 sends the selected position table to the controller 30. In an embodiment of the present disclosure, the position table is stored in the controller 30 installed on the handlebar. The controller 30 installed on the handlebar further sends the position table to the driver 20 installed on the rear derailleur for its storage.

Step S37 shows "entering a normal mode by the controller". The setting of the derailleur position has been finished since the controller 30 received the position table sent by the mobile device 40. At this time, the controller 30 may automatically enter the normal mode, or may manually enter the normal mode after receiving a second operation performed by the user on the handlebar. In should be noticed that the controller entering the normal mode may still send the adjustment instruction, and the adjustment level of the current adjustment instruction is greater than the adjustment level of the adjustment instruction sent by the controller 30 under the fine-tuning mode.

Figure 4:
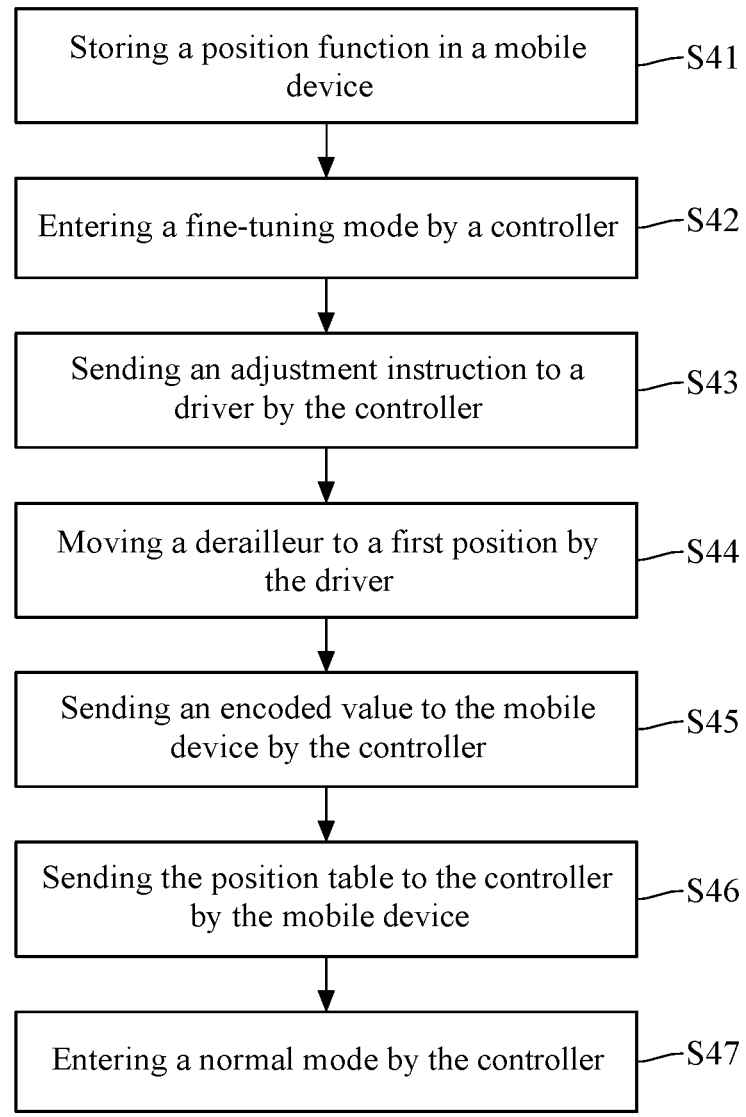
FIG. 4 is a flow chart of the derailleur position setting method according to another embodiment of the present disclosure.

Please refer to FIG. 4, which illustrates a flow chart of the derailleur position setting method according to another embodiment of the present disclosure. Said method is adapted to the derailleur position setting systems 100 as shown in FIG. 1 or adapted to the derailleur position setting systems 200 as shown in FIG. 2. The following takes the derailleur position setting systems 200 as the example for description.

Step S41 shows "storing a position function in a mobile device". For example, the user may download the configuration file of the position function from the website of the bicycle manufacturer, or the user may define the position function by himself through the application performed on the mobile device.

Steps S42-S45 of FIG. 4 are basically identical to steps S32-S35 of FIG. 3, so the descriptions are not repeated here.

Step S46 shows "sending the position table to the controller 70 by the mobile device". Specifically, in this embodiment, the mobile device input the position function described in step S41 with the encoded value received from the controller 70 and generates a plurality of position tables corresponding to different gear positions. In step S46, the mobile device collects these calculated position parameters to form a position table, and sends this position table to the controller 70.

Steps S47 of FIG. 4 is basically identical to step S37 of FIG. 3, so the description is not repeated here.

Figure 5:
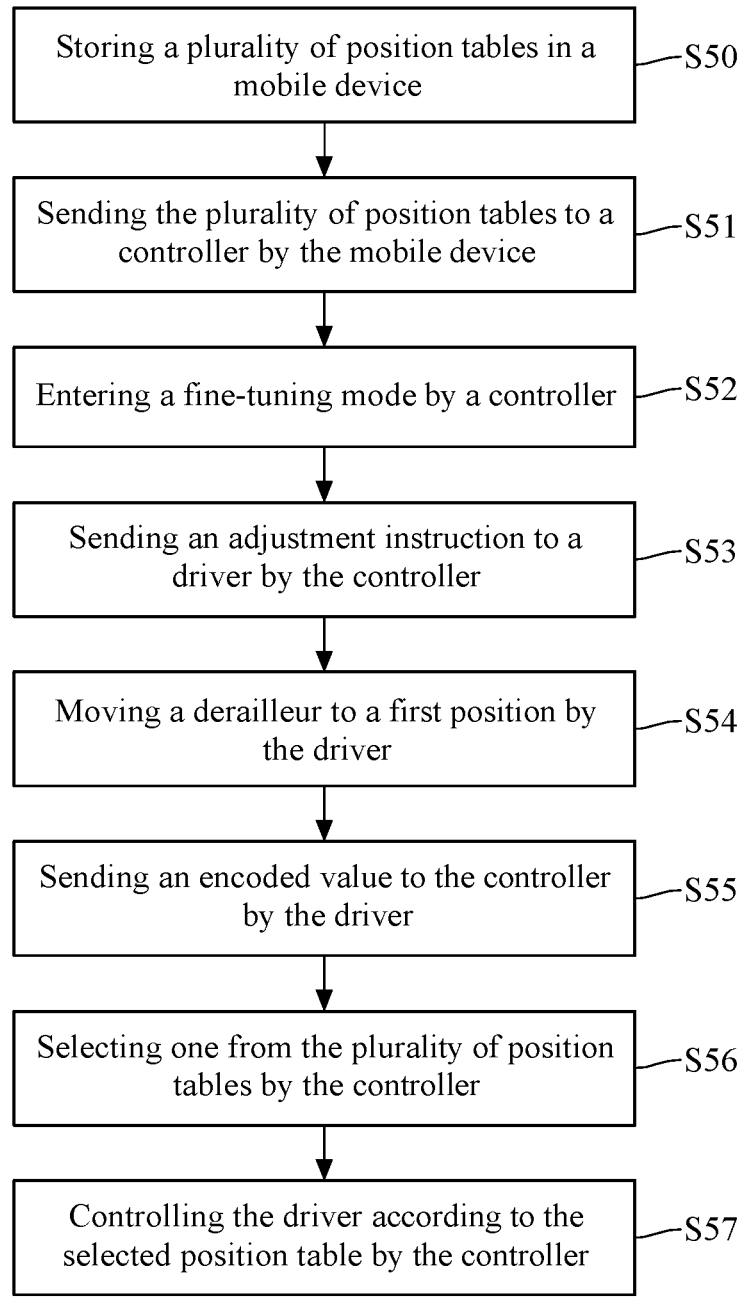
FIG. 5 is a flow chart of the first example of the derailleur position setting method according to further another embodiment of the present disclosure.

Please refer to FIG. 5, which illustrates a flow chart of the first example of the derailleur position setting method according to further another embodiment of the present disclosure. Said method is adapted to the derailleur position setting systems 100 as shown in FIG. 1 or adapted to the derailleur position setting systems 200 as shown in FIG. 2. The following takes the derailleur position setting systems 100 as the example for description.

Step S50 shows "storing a plurality of position tables in a mobile device 40". Step S50 is basically identical to step S31 of FIG. 3, so the description is not repeated here.

Step S51 shows "sending the plurality of position tables to a controller 30 by the mobile device 40". These position tables are different from one another. Each position table has a plurality of position parameters. Each position parameter indicates a designated gear position to which the derailleur 10 is allowable to be set. All position tables stored in the mobile device 40 in step S50 are sent to the controller 30 in step S51.

Steps S52-S54 are basically identical to steps S32-S34 of FIG. 3, so the descriptions are not repeated here.

Step S55 shows "sending an encoded value to the controller 30 by the driver 20". Specifically, when both the controller 30 and the driver 20 are installed on the rear derailleur, the driver 20 may send the encoded value through a wired communication. On the other hand, when the controller 30 is installed on the left handlebar or on the right handlebar and the driver 20 is installed on the rear derailleur, the driver 20 may send the encoded value through a wireless communication. However, the way to send the encoded value is not limited in the present disclosure. After step S55 is finished, the controller 30 stores the encoded value in its storage component.

Step S56 shows "selecting one from the plurality of position tables by the controller 30". Step S57 shows "controlling the driver 20 according to the selected position table by the controller 30".

In the first example of the derailleur position setting method according to further another embodiment of the present disclosure, the mobile device 40 sends all the position tables stored in itself to the controller 30, and then the controller 30 determines to use one of these position tables according to the encoded value.

Figure 6:
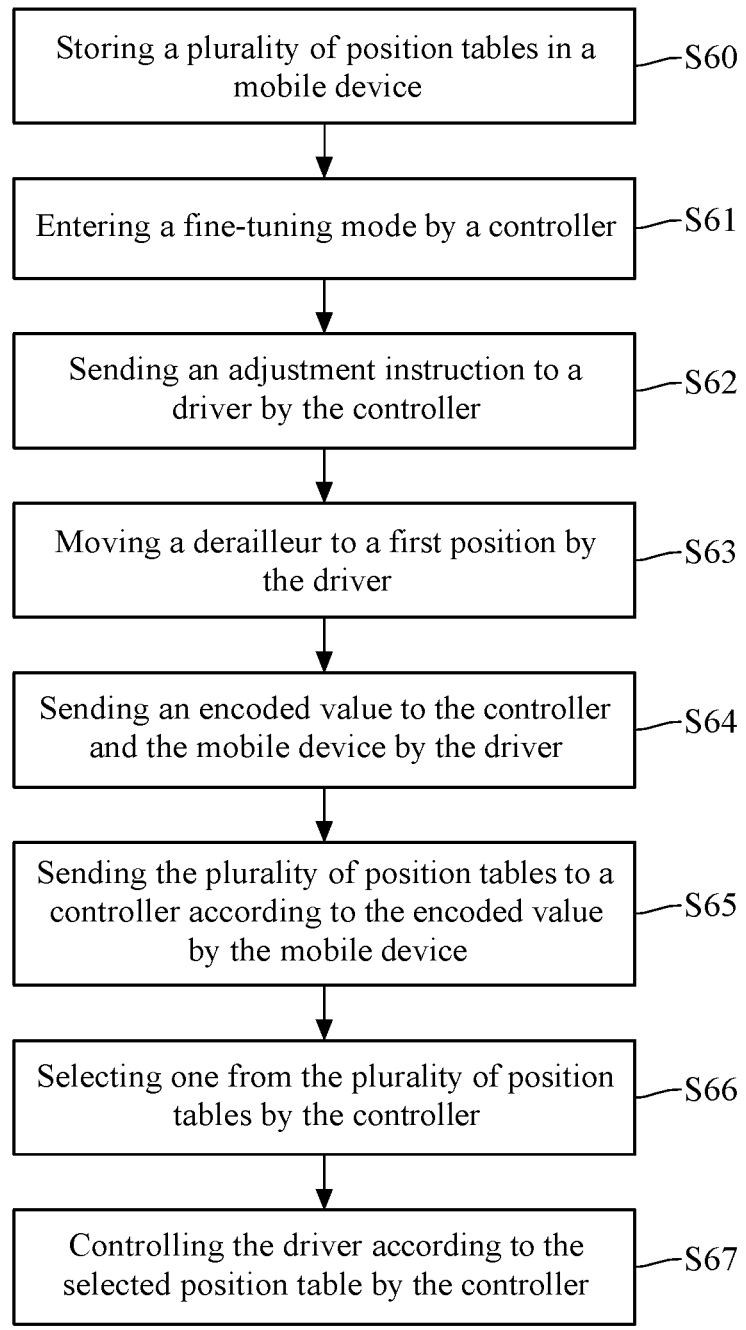
FIG. 6 is a flow chart of the second example of the derailleur position setting method according to further another embodiment of the present disclosure.

Please refer to FIG. 6, which illustrates a flow chart of the second example of the derailleur position setting method according to further another embodiment of the present disclosure. Said method is adapted to the derailleur position setting systems 100 as shown in FIG. 1 or adapted to the derailleur position setting systems 200 as shown in FIG. 2. The following takes the derailleur position setting systems 100 as the example for description.

Steps S60, S61, S62, and S63 of FIG. 6 are respectively identical to steps S50, S52, S53, and S54 of FIG. 5, so the descriptions are not repeated here.

Step S64 shows "sending an encoded value to the controller 30 and the mobile device 40 by the driver 20". For example, the driver 20 sends the encoded value to the controller 30 through a wireless communication, and the controller 30 stores the encoded value and forwards the encoded value to the mobile device 40. For another example, the driver 20 may directly send the encoded value to the controller 30 and the mobile device 40. The present disclosure does not limit the way nor the path for sending the encoded value in step S64.

Step S65 shows "sending the plurality of position tables to a controller 30 according to the encoded value by the mobile device 40". For example, the mobile device 40 calculates difference values between the encoded value received in step S64 and each of the candidate position parameters of each candidate position tables stored in the mobile device 40. The mobile device 40 selects at least two from the plurality of candidate position tables whose difference values are in a specified range and sends these two position tables to the controller 30. In short, the mobile device 40 may filter some of the candidate position tables allowable to be sent to the controller 30 according to the encoded value, rather than directly sending all candidate position tables stored in the mobile device 40.

Step S66 shows "selecting one from the plurality of position tables by the controller 30". For example, based on the encoded value received in step S64, the controller 30 may select one from said at least two position tables received in step S65. For another example, the controller 30 may again request the driver 20 to send the encoded value in step S66 to obtain the real-time gear position of the derailleur 10, and thereby selecting the position table.

Step S67 is basically identical to step S57 of FIG. 5, so the description is not repeated here.

In view of the above description, the derailleur position setting system and method thereof proposed by the present disclosure store the position table or the position function in an external device such as a mobile device, and thus increasing the scalability of the position table. The present disclosure allows the user to easily update the position parameters of the position table without being limited to the default values stored in the controller. Furthermore, because the microcontroller in the derailleur only needs to send the encoded value associated with the position, the microcontroller does not need to calculate the position table associated with the encoded value. Therefore, the power consumption and other computation costs of the microcontroller can be saved.

What is claimed is:

1. A derailleur position setting method adapted to a bicycle comprising:
   sending an adjustment instruction to a driver by a controller;
   setting a derailleur to a gear position according to the adjustment instruction by the driver;
   sending an encoded value corresponding to the gear position to a mobile device by the controller; and
   sending a position table to the controller according to the encoded value by the mobile device;
   wherein the position table comprises a plurality of position parameters, and each of the plurality of position parameters indicates a designated gear position to which the derailleur is allowable to be set.

2. The derailleur position setting method of claim 1, wherein the driver is disposed on a cassette of the bicycle and the cassette has a plurality of sprockets, and setting the derailleur to the gear position according to the adjustment instruction by the driver further comprises:
   driving a chain guide of the derailleur to move a designated distance according to the designated distance of the adjustment instruction by the driver so that the derailleur is set at the gear position, wherein the designated distance is smaller than a distance of two adjacent sprockets of the plurality of sprockets.

3. The derailleur position setting method of claim 1, before sending the adjustment instruction to the driver by the controller, further comprising:
   generating the adjustment instruction by the mobile device; and
   sending the adjustment instruction to the controller by the mobile device.

4. The derailleur position setting method of claim 3, wherein sending the encoded value corresponding to the gear position to the mobile device by the controller further comprises:
   generating the encoded value according to the gear position by the driver;
   after generating the encoded value by the driver, sending a return instruction to the driver by the controller, wherein the return instruction is generated by the controller or generated by the mobile device;
   after receiving the return instruction by the driver, sending the encoded value to the controller by the driver; and
   after receiving the encoded value by the controller, sending the encoded value to the mobile device by the controller.

5. The derailleur position setting method of claim 1, after sending the position table to the controller according to the encoded value by the mobile device, further comprising:
   sending the position table to the driver by the controller.

6. The derailleur position setting method of claim 1, wherein
   before sending the position table by the mobile device, further comprises: storing a plurality of candidate position tables in the mobile device;
   sending the position table according to the encoded value comprises: calculating a plurality of difference values between the encoded value and a plurality of candidate position parameters of the plurality of candidate position tables respectively; and
   selecting one of the plurality of candidate position tables to be served as the position table so that the selected position table corresponds to a minimal one of the difference values and sending the selected position table by the mobile device.

7. The derailleur position setting method of claim 1, before sending the position table by the mobile device, further comprising:
   storing a position function to the mobile device;
   sending the position table according to the encoded value by the mobile device further comprising:
   generating a plurality of output values by inputting the position function with the encoded value; and
   forming the position table with the plurality of output values and sending the position table.

8. The derailleur position setting method of claim 1, wherein
   before sending the adjustment instruction to the driver by the controller, the method further comprises:
   determining whether the controller receives a first operation by the controller; and
   entering a fine-tuning mode according to the first operation when the controller determines that the controller receives the first operation; and
   after sending the position table to the controller according to the encoded value by the mobile device, the method further comprises:
   determining whether the controller receives a second operation by the controller; and
   entering a normal mode according to the second operation when the controller determines that the controller receives the second operation;
   wherein an adjustment level of the adjustment instruction sent by the controller entering the fine-tuning mode is smaller than the adjustment level of the adjustment instruction sent by the controller entering the normal mode.

9. The derailleur position setting method of claim 1, after sending the encoded value corresponding to the gear position to the mobile device by the controller, further comprising:
   sending the encoded value to the mobile device.

10. The derailleur position setting method of claim 6, after sending the encoded value to the mobile device, further comprising:
    selecting at least two from the plurality of candidate position tables according to the encoded value and sending said at least two candidate position tables to the controller by the mobile device.

11. A derailleur position setting method adapted to a bicycle comprising:
- sending a plurality of position tables to a controller by a mobile device, wherein the position tables are different from one another, each of the position tables has a plurality of position parameters, and each of the plurality of position parameters indicates a designated gear position to which a derailleur is allowable to be set;
- sending an adjustment instruction to a driver by the controller;
- setting the derailleur to a gear position according to the adjustment instruction by the driver;
- sending an encoded value corresponding to the gear position to the controller by the driver; and
- selecting one from the plurality of position tables according to the encoded value and controlling the driver according to the selected position table by the controller.

12. A derailleur position setting system adapted to a bicycle comprising:
- a derailleur allowable to be set in a plurality of gear positions;
- a driver connecting to the derailleur and setting the derailleur to one of the plurality of gear positions according to an adjustment instruction;
- a controller electrically connecting to the driver, wherein the controller is configured to send the adjustment instruction and send an encoded value of said one of the plurality of gear positions; and
- a mobile device communicably connecting to the controller, wherein the mobile device is configured to store a plurality of position tables, receive the encoded value from the controller, and send one of the plurality of position tables to the controller according to the encoded value;
- wherein each of the position tables has a plurality of position parameters, and each of the plurality of position parameters indicates a designated gear position to which the derailleur is allowable to be set.

13. The derailleur position setting system of claim 12, wherein the mobile device is further configured to calculate a plurality of difference values between the encoded value and the plurality of position parameters of the plurality of position tables respectively, and selecting one of the plurality of position tables so that the selected position table corresponds to a minimal one of the difference values.

14. A derailleur position setting system adapted to a bicycle comprising:
- a derailleur allowable to be set in a plurality of gear positions;
- a driver connecting to the derailleur and setting the derailleur to one of the plurality of gear positions according to an adjustment instruction;
- a controller electrically connecting to the driver, wherein the controller is configured to send the adjustment instruction and send an encoded value of said one of the plurality of gear positions; and
- a mobile device communicably connecting to the controller, wherein the mobile is configured to store a position function, receive the encoded value from the controller, input the position function with the encoded value to generate a plurality of position parameters, form a position table with the plurality of position parameters and send the position table to the controller;
- wherein each of the plurality of position parameters indicates a designated gear position to which the derailleur is allowable to be set.

15. A derailleur position setting system adapted to a bicycle and a mobile device, wherein the mobile device is configured to store a plurality of position tables and the system comprises:
- a derailleur allowable to be set in a plurality of gear positions;
- a driver connecting to the derailleur and setting the derailleur to one of the plurality of gear positions according to an adjustment instruction; and
- a controller electrically connecting to the driver, wherein the controller is configured to send the adjustment instruction, send an encoded value corresponding to said one of the plurality of gear positions to the mobile device, and drive the mobile device to return one of the plurality of position tables with said one of the plurality of position tables corresponds to the encoded value;
- wherein said one of the plurality of position tables has a plurality of position parameters, and each of the plurality of position parameters indicates a designated gear position to which the derailleur is allowable to be set.

16. A derailleur position setting system adapted to a bicycle and a mobile device, wherein the mobile device is configured to store a position function and the system comprises:
- a derailleur allowable to be set in a plurality of gear positions;
- a driver connecting to the derailleur and setting the derailleur to one of the plurality of gear positions according to an adjustment instruction; and
- a controller electrically connecting to the driver, wherein the controller is configured to send the adjustment instruction, send an encoded value corresponding to said one of the plurality of gear positions to the mobile device, and drive the mobile device to return a position table associated with the encoded value;
- wherein the position table returned to the controller has a plurality of position parameters, the plurality of position parameters is calculated by inputting the position function with the encoded value by the mobile device; and each of the plurality of position parameters indicates a designated gear position to which the derailleur is allowable to be set.

* * * * *